United States Patent [19]
Kim

[11] Patent Number: 5,852,704
[45] Date of Patent: Dec. 22, 1998

[54] TWO-PICTURE VIDEO RECORDING/REPRODUCING APPARATUS AND A METHOD THEREFOR

[75] Inventor: Eui Duck Kim, Seo-Ku, Rep. of Korea

[73] Assignee: Goldstar Co., Ltd., Seoul, Rep. of Korea

[21] Appl. No.: 365,296

[22] Filed: Dec. 28, 1994

[30] Foreign Application Priority Data

Dec. 31, 1993 [KR] Rep. of Korea .................. 1993 32129

[51] Int. Cl.⁶ .................................................. H04N 5/76
[52] U.S. Cl. ............................................... 386/46; 386/52
[58] Field of Search ................................... 358/335, 311, 358/906, 342; 360/15, 13, 33.1; 348/565; 386/46, 102, 52, 121, 47, 81; H04N 5/76

[56] References Cited

U.S. PATENT DOCUMENTS

| | | | |
|---|---|---|---|
| 4,224,644 | 9/1980 | Lewis et al. | 360/722 |
| 4,447,837 | 5/1984 | Hirata et al. | 358/906 |
| 4,729,027 | 3/1988 | Hakamada et al. | 348/565 |
| 4,890,168 | 12/1989 | Inoue et al. | 358/335 |
| 4,949,179 | 8/1990 | Hosono | 348/565 |
| 5,040,067 | 8/1991 | Yamazaki | 348/565 |
| 5,124,807 | 6/1992 | Dunlap et al. | 358/316 |
| 5,237,417 | 8/1993 | Hayashi et al. | 348/565 |
| 5,257,142 | 10/1993 | Hong | 358/335 |
| 5,426,534 | 6/1995 | Nakata et al. | 360/15 |

*Primary Examiner*—Thai Tran
*Assistant Examiner*—Huy Nguyen
*Attorney, Agent, or Firm*—John P. White; Cooper & Dunham LLP

[57] ABSTRACT

A two-picture video recording/reproducing apparatus and method automatically edits & records a video signal from an 8 mm video recorder/reproducer onto a VHS video recorder/reproducer, monitors the recording state on a sub-picture, and records an externally input signal by the video recorder/reproducer to monitor it on the sub-picture while watching a TV broadcast signal on a main picture. For this, the apparatus has a data input unit for receiving a signal by a user's key manipulation to supply corresponding data, first and second video recorders/reproducers for loading a tape, a main picture selector for selecting any one of a signal from the IF processor, an externally input signal via an input terminal, and video signals from the video recorders/reproducers to supply a selected signal as a main picture video signal, a sub-picture selector for selecting any one of the signal from the IF processor, the externally input signal, and the video signals from the video recorders/reproducers to supply a selected signal as a sub-picture video signal, an external input selector for selecting the signal from the IF processor or the externally input signal to supply a selected signal as a record video signal of the video recorders/reproducers, a system controller for receiving data from the data input unit to supply corresponding control signals to the main picture, sub-picture and external input selectors and supplying operational mode control signals to control the video recorders/reproducers, a sub-picture controller for receiving to mix the video signals of the main picture and sub-picture selected by the main picture and sub-picture selectors, and a receiver for processing the mixed video signal as of the main picture and sub-picture to display the processed signal.

13 Claims, 4 Drawing Sheets

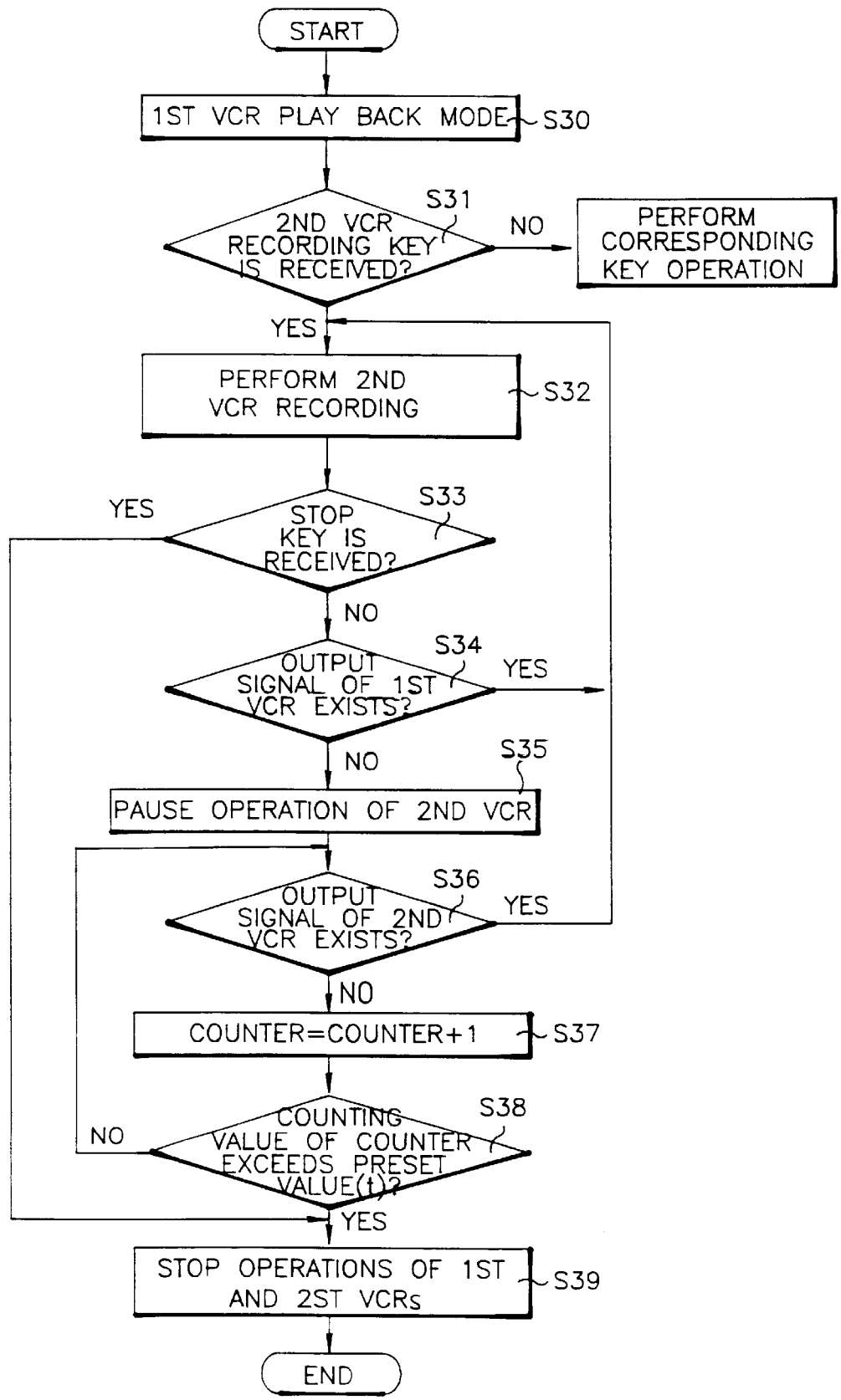

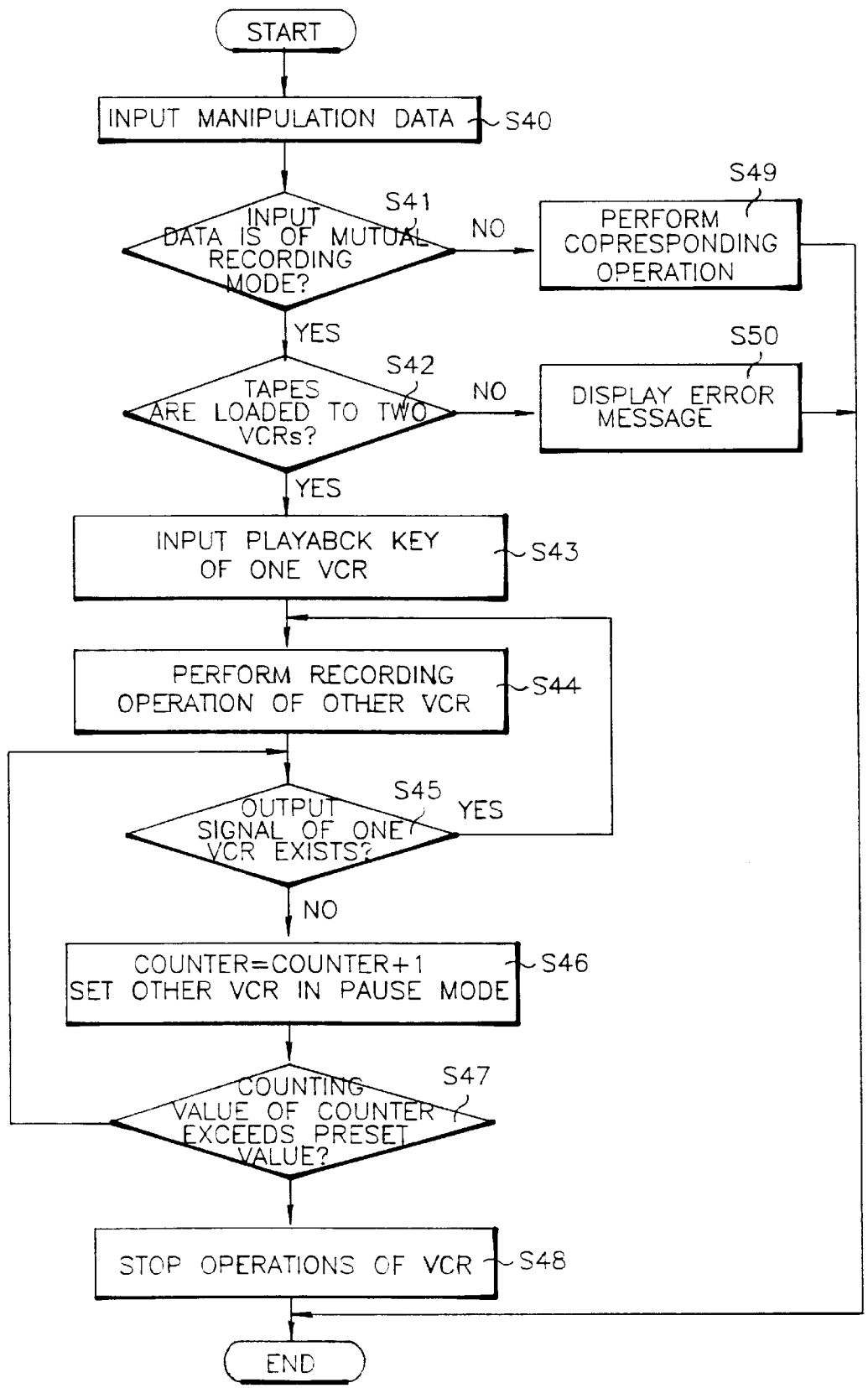

TWO-PICTURE VIDEO RECORDING/
REPRODUCING APPARATUS AND A
METHOD THEREFOR

BACKGROUND OF THE INVENTION

1. Field of the Invention

The present invention relates to a two-picture video recording/reproducing apparatus for combining two video recorders/reproducers to a television, and more particularly to a two-picture video recording/reproducing apparatus and method therefor, wherein signals mutually edited and recorded between video recorders/reproducers of different system are displayed on a sub-picture while a television broadcast signal or externally input signal is displayed on a main picture, thereby being capable of monitoring a recording state while watching signals of the main picture.

2. Description of the Prior Art

FIG. 1 is a circuit diagram illustrating a video recording/reproducing apparatus for displaying a general television broadcast signal or externally input signal, and data recorded on a tape.

Referring to FIG. 1, the video recording/reproducing apparatus includes a tuner 1, an intermediate frequency signal (IF) processor 2, a system controller 3, a color signal processor 4, a receiver 5, a deflector 6, a switching portion 7 and a VCR 8 which is a video recorder/reproducer.

Once a power is supplied to the conventional video recording/reproducing apparatus, movable shifting terminals m of switches SW1 and SW2 in the switching portion 7 are connected to terminals NC in the initial state. Thus, the television broadcast signal received via an antenna is supplied to the color signal processor 4 through the tuner 1 and IF processor 2, and displayed through the receiver 5 by means of a deflection signal from the deflector 6.

When the television broadcast signal from the IF processor 2 is intended to be recorded on a recording medium mounted to a deck of the video recorder/reproducer 8, the system controller 3 implements a program in response to input data to supply a recording control signal to the video recorder/reproducer 8. By this operation, the mode of the video recorder/reproducer apparatus 8 is changed to a recording mode to record the television broadcast signal having passed through the switch SW2 of the switching portion 7.

Meanwhile, when a video signal supplied via an external input terminal IN or video signal from the video recorder/reproducer 8 is intended to be displayed through the receiver 5, the system controller 3 converts the movable shift terminals m of the switches SW1 and SW2 in the switching portion 7 to terminals a. Accordingly, the video signal from the video recorder/reproducer 8 is supplied to the receiver 5 via the switch SW1 to be displayed thereon.

The video recording/reproducing apparatus operated as above neither records the externally input signal by means of the video recorder/reproducer while a user watches the television broadcast, nor records the television broadcast by means of the video recorder/reproducer while watching the externally input signal Moreover, a separate 8 mm video recorder/reproducer is required for recording the content recorded by an 8 mm video camera onto a video home system (VHS) tape.

SUMMARY OF THE INVENTION

It is an object of the present invention to provide a two-picture video recording/reproducing apparatus and method therefor, wherein a television broadcast signal or externally input signal is displayed on a main picture while a video signal from one video recorder/reproducer is displayed on a sub-picture, and the video signal displayed on the sub-picture is recorded by using the other video recorder/reproducer.

It is another object of the present invention to provide a two-picture video recording/reproducing apparatus and method therefor for performing an automatic editing by stopping the operation of the other video recorder/reproducer when one video recorder/reproducer supplies no signal.

It is still another object of the present invention to provide a two-picture video recording/reproducing apparatus and method therefor capable of monitoring an automatic editing state by displaying an automatically edited and recorded video signal on a sub-picture when the video signal from one video recorder/reproducer is automatically edited by the other video recorder/reproducer between the video recorders/reproducers having different system while displaying a television broadcast signal on a main picture.

It is yet another object of the present invention to provide a two-picture recording/reproducing apparatus and method therefor capable of monitoring a mutual editing state by displaying a mutually edited and recorded video signal on a sub-picture when video recorders/reproducers having different system perform a mutual editing & recording operation while displaying a television broadcast signal on a main picture.

To achieve the above object of the present invention, there is provided a two-picture video recording/reproducing apparatus which includes a tuner for receiving a television broadcast signal via an antenna to supply a video signal, and an intermediate frequency (IF) processor for processing the video signal from the tuner into an IF signal. Furthermore, a data input unit receives a signal by a user's key manipulation and supplies predetermined data corresponding to the key manipulation, a first video recorder/reproducer having a deck capable of loading a tape records the input video signal on the tape loaded to the deck in a first system or reproduces to output the video signal recorded on the tape loaded to the deck in the first system in accordance with an operational mode control signal, and a second video recorder/reproducer having a deck capable of loading a tape records the input video signal on the tape loaded to the deck in a second system or reproduces to output the video signal recorded on the tape loaded to the deck in the second system in accordance with an operational mode control signal. A main picture selector selects any one among a signal from the IF processor, an externally input signal via an input terminal, and video signals from the first and second video recorders/reproducers in accordance with a first control signal, and supplies a selected signal as a video signal of the main picture. A sub-picture selector selects any one among the signal from the IF processor, the externally input signal via the input terminal, and the video signals from the first and second video recorders/reproducers in accordance with a second control signal, and supplies a selected signal as a video signal of the sub-picture. An external input selector selects either the signal from the IF processor or the externally input signal via the input terminal in accordance with a third control signal, and supplies a selected video signal as a record video signal to be recorded to the first and second video recorders/reproducers. Also, a system controller receives data from the data input unit to respectively supply the first to third control signals corresponding to the input data to the main picture selector, sub-picture selector and external input selector, and supplies fourth and fifth control signals to control the operational modes of the first and second video recorders/reproducers, a sub-picture controller receives to mix the video signals of the main picture and sub-picture selected by the main picture selector and sub-picture selector, and a receiver processes the mixed video signal from the sub-picture controller as of the main picture and sub-picture to display the processed signal.

To achieve another object of the present invention, there is provided an automatic editing & recording method of a two-picture video recording/reproducing apparatus having first and second video recorders/reproducers of different system. The method is performed by a first recording mode conversion step that changes the mode of the first video recorder/reproducer to a playback mode, determines whether a record key is received to the second video recorder/reproducer or not, and changes the mode of the second video recorder/reproducer to a recording mode when the record key is received, and then, a signal output determining step of determining whether a video signal is supplied from the first video recorder/reproducer. Successively, a still mode conversion step is carried out by changing the mode of the second video recorder/reproducer to a still mode when the video signal is not supplied, and a second recording mode conversion step is carried out by changing the mode of the second video recorder/reproducer to the recording mode when the video signal is supplied within a predetermined time after being converted to the still mode to perform the recording operation.

To achieve still another object of the present invention, there is provided a mutual editing & recording method of a two-picture video recording/reproducing apparatus having video recorders/reproducers of different system, in which a data determining step is performed by determining whether input data is of a mutual editing & recording mode or not, and a tape loading determining step is then performed by determining whether tapes are loaded to respective video recorders/reproducers or not when the input data is of the mutual editing & recording mode. Thereafter, a mode conversion step changes the mode of one of the video recorder/reproducer to a playback mode, changes the mode of the other video recorder/reproducer to a recording mode to record a video signal from one video recorder/reproducer, a signal output determining step determines whether the video signal is supplied from either one of the video recorders/reproducers, and a time counting step changes the other video recorder/reproducer to a still mode when the video signal is not supplied, and counting the time with no video signal. Finally, a still mode conversion step of changing the modes of the video recorders/reproducers to a stop mode when the counting value exceeds a preset value is carried out.

BRIEF DESCRIPTION OF THE DRAWINGS

The above objects and other advantages of the present invention will become more apparent by describing in detail preferred embodiments thereof with reference to the attached drawings in which:

FIG. 3 is flow chart for illustrating an automatic editing & recording method of the two-picture video recording/reproducing apparatus shown in FIG. 2; and FIG. 4 is a flow chart for illustrating a mutual editing & recording method of the two-picture video recording/reproducing apparatus shown in FIG. 2.

DETAILED DESCRIPTION OF THE PREFERRED EMBODIMENT

Figure 2:
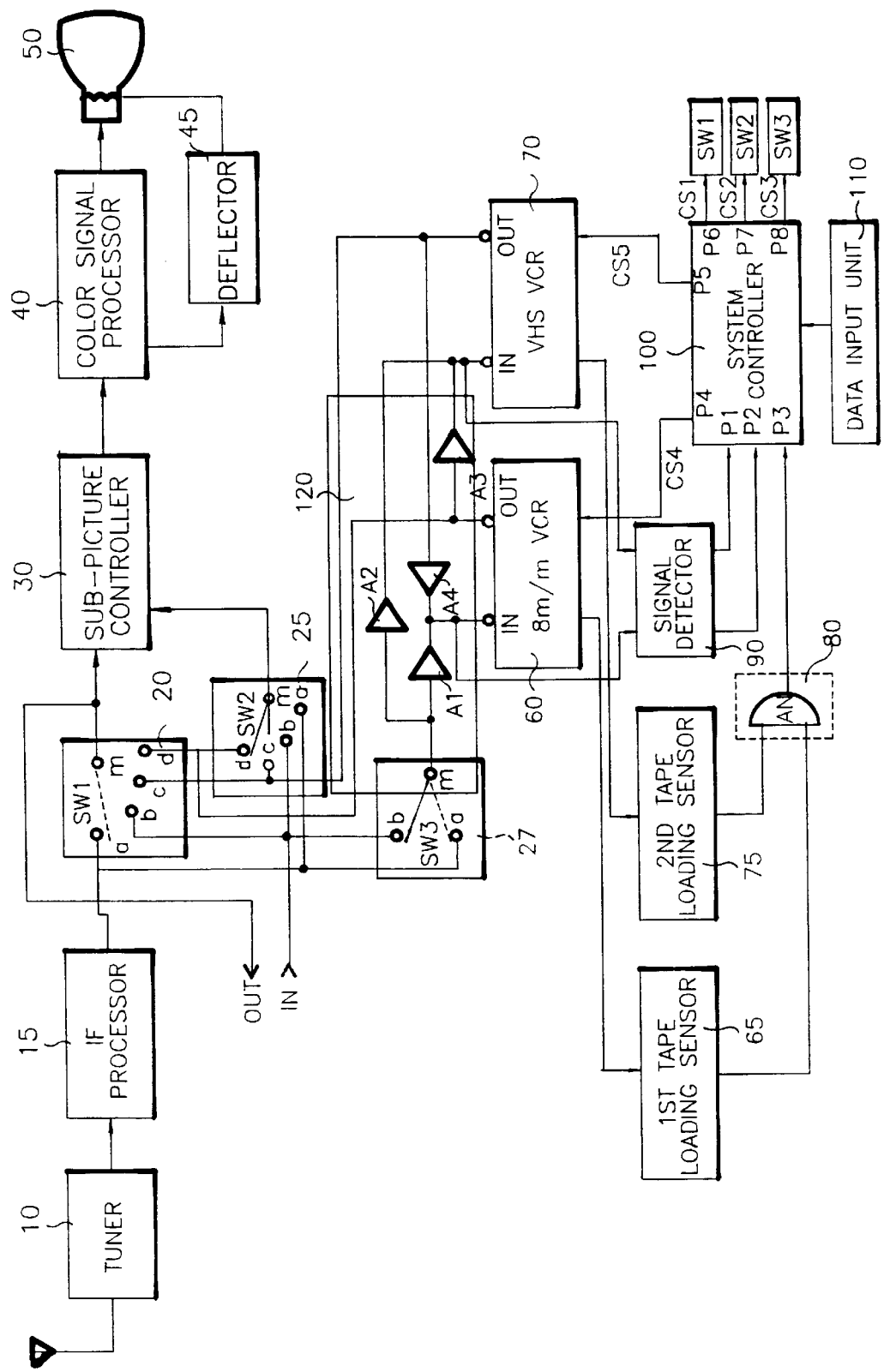
FIG. 2 is a circuit diagram showing one embodiment of a two-picture video recording/reproducing apparatus according to the present invention.

Referring to FIG. 2 which is a circuit diagram showing a two-picture video recording/reproducing apparatus according to the present invention, the embodiment of the present invention includes a tuner 10, an IF processor 15, a main picture selector 20, a sub-picture selector 25, an external input selector 27, a sub-picture controller 30, a color signal processor 40, a deflector 45, a receiver 50, a first video recorder/reproducer 60 of 8 mm system, a second video recorder/reproducer 70 of VHS system, first and second tape loading sensors 65 and 75, a tape loading confirmation sensor 80, a signal detector 90, a system controller 100 and a data input unit 110.

The system controller 100 is constructed for receiving output signals of the data input unit 110 that receives predetermined data from a user to operate overall system, of the tape loading confirmation unit 80 and of the signal detector 90, thereby, in accordance with the received signal, supplying control signals CS4 and CS5 that control operational modes of the first and second video recorders/reproducers 60 and 70, control signals CS1 and CS2 that control the main and sub picture selectors 20 and 25, and a control signal CS3 that controls the external input selector 27.

The main picture selector 20 consists of a switch SW1 which selects any one among a broadcast signal from the IF processor 15 to a terminal a thereof, an externally input signal supplied to a terminal b via an input terminal IN, a video signal from the second video recorder/reproducer 70 to a terminal c, and a video signal from the first video recorder/reproducer 60 to a terminal d, in accordance with the control signal CS1 from the system controller 100, and provides the selected signal to the sub-picture controller 30 as a video signal of the main picture.

A sub-picture selector 25 consists of a switch SW2 which selects any one among the broadcast signal from the IF processor 15 to a terminal a thereof, the externally input signal to a terminal b via the input terminal IN, the video signal from the second video recorder/reproducer 70 to a terminal c, and the video signal from the first video recorder/reproducer 60 to a terminal d, in accordance with the control signal CS2 from the system controller 100, and provides the selected signal to the sub-picture controller 30 as the sub-picture.

The external input selector 27 consists of a switch SW3 which selects either one of the broadcast signal from the IF processor 15 to a terminal a thereof or the externally input signal to a terminal b via the input terminal IN, in accordance with the control signal CS from the system controller 100, and provides the selected signal to the first and second recorders/reproducers 60 and 70 as a recording signal.

The sub-picture controller 30 receives the main picture signal and sub-picture signal from the main picture selector 20 and sub-picture selector 25, respectively, and mixes the input main picture signal with the sub-picture signal to supply the result to the receiver 50 via the color signal processor 50, so that the sub-picture is displayed in the main picture.

The two-picture recording/reproducing apparatus according to the present invention further has an amplifying unit 120 for amplifying the signal from the external input selector 27 or the video signals from the first and second video recorders/reproducers 60 and 70.

The amplifying unit 120 is formed of unidirectional amplifiers A1 and A2 for amplifying the signal from the external input selector 27 to output the amplified signal to the first and second video recorders/reproducers 60 and 70, and unidirectional amplifiers A3 and A4 for amplifying the output signals of the first and second video recorders/reproducers 60 and 70 to output the amplified signals to the second and first video recorders/reproducers 70 and 60.

The first and second tape loading sensors 65 and 75 respectively monitor whether tapes are loaded onto the first and second video recorders/reproducers 60 and 70, and produce tape loading sense signals to the tape loading confirmation unit 80.

The tape loading confirmation unit 80 is formed of an AND gate AN which receives the tape loading sense signals from the first and second tape loading sensors 65 and 75, and performs NAND operation of the two tape loading sense signals to supply the result to the system controller 100 as a tape loading confirmation signal.

The signal detector 90 receives the output signal of the first video recorder/reproducer 60 supplied via the amplifying unit 120 to detect whether the video signal is received from the first video recorder/reproducer 60 to the second video recorder/reproducer 70, and receives the output signal from the second video recorder/reproducer 70 supplied via the amplifying unit 120 to detect whether the video signal is received from the second video recorder/reproducer 70 to the first video recorder/reproducer 60, thereby outputting the detected signal to the system controller 100.

The first video recorder/reproducer 60 being the 8 mm system VCR records either the video signal via the external input unit 27 or that from the second video recorder/reproducer 70 in the 8 mm system in accordance with the operational mode control signal CS4 from the system controller 100; otherwise, outputs the video signal reproduced from the 8 mm tape mounted to a deck thereof to the amplifying unit 120.

The second video recorder/reproducer 70 being the VHS VCR records either the video signal via the external input selector 27 or that from the first video recorder/reproducer 60 in the VHS system in accordance with the operational mode control signal CS5 from the system controller 100; otherwise, outputs the video signal reproduced from the VHS tape mounted to a deck thereof to the amplifying unit 120.

Figure 1:
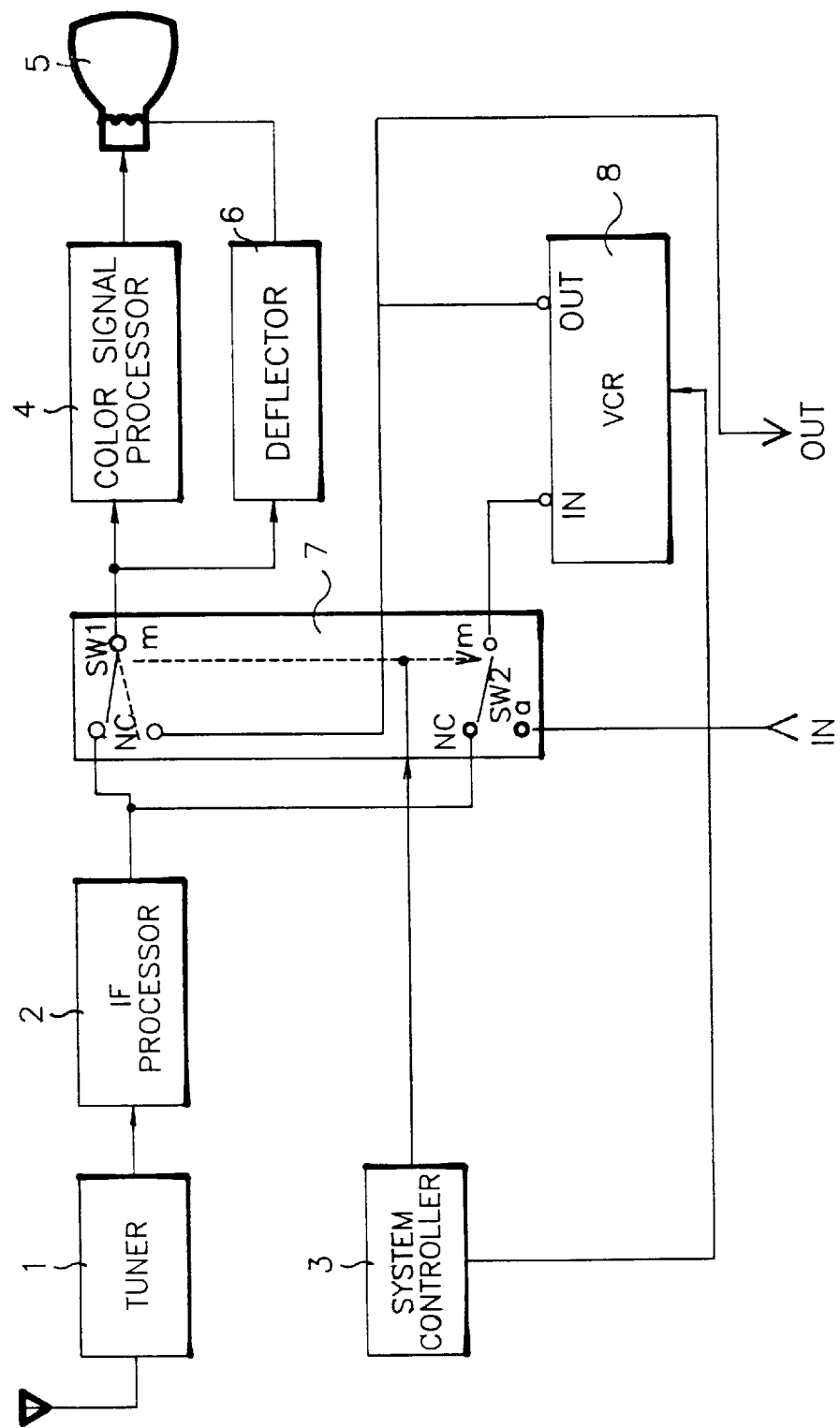
FIG. 1 is a schematic block diagram showing a conventional composite video recording/reproducing apparatus.

The operations of the tuner 10, IF processor 15, color signal processor 40 and deflector 45 are the same as those of FIG. 1.

Hereinafter, the operation of the two-picture video recording/reproducing apparatus having the foregoing structure according to the present invention will be described.

When corresponding data is received into the data input unit 110 in order to display any one among the television broadcast signal, externally input signal and signals from the first and second video recorders/reproducers 60 and 70 on the main picture, and display any one among the above signals on the sub-picture, the system controller 100 scans the receives data to supply the first and second control signals CS1 and CS2 to the switches SW1 and SW2 of the main picture selector 20 and sub-picture selector 25 via I/O ports P6 and P7, and the movable shift terminals m of the switches SW1 and SW2 are converted in accordance with the received control signals to respectively select the video signals of the main picture and sub-picture, thereby supplying the selected signals to the sub-picture controller 30.

The sub-picture controller 30 mixes the video signals of the main picture and sub-picture to provide the result to the receiver 50 via the color signal processor 40, so that the main picture and sub-picture signals desired by a user are displayed.

For example, the operation of the two-picture video recording/reproducing apparatus will be described below, in which the television broadcast signal received via the antenna is processed as of the main picture, and the video signal from the first video recorder/reproducer 60 is as of the sub-picture.

When the user supplies corresponding data to the data input unit 110 in order to display the television broadcast signal received via the antenna on the main picture, and display the video signal from the first video recorder/reproducer 60 on the sub-picture, the system controller 100 scans the data from the data input unit 110 to output data corresponding thereto.

In other words, the first control signal CS1 is supplied via the I/O port P6 to connect the movable shift terminal m of the switch SW1 in the main picture selector 20 to the fixed terminal a, and the second control signal CS2 is supplied via the I/O port P7 to connect the movable shift terminal m of the switch SW2 in the sub-picture selector 25 to the fixed terminal d.

Therefore, the main picture selector 20 selects the television broadcast signal from the IF processor 15 among the television broadcast signal from the IF processor 15, externally input signal via the input terminal IN and output signals from the first and second video recorders/reproducers 60 and 70 as of the main picture to supply the selected signal to the sub-picture controller 30. Also, the sub-picture selector 25 selects the video signal from the first video recorder/reproducer 60 among the television broadcast signal from the IF processor 15, externally input signal via the input terminal IN and output signals from the first and second video recorders/reproducers 60 and 70 as of the sub-picture to supply the selected signal to the sub-picture controller 30.

The sub-picture controller 30 mixes the video signals of the main picture and sub-picture from the main picture and sub-picture selectors 20 and 25 to output the result to the receiver 50 via the color signal processor 40, so that the television broadcast signal is displayed on the main picture and, at the same time, the video signal reproduced from the first video recorder/reproducer 60 is displayed on the sub-picture.

On the other hand, the operation of processing the television broadcast signal received via the antenna as of the main picture, and recording the externally input signal from the input terminal IN on the tape loaded to the decks of the first and second video recorders/reproducers 60 and 70 while being processed as the sub-picture to monitor the recording state, will be described below.

When the user displays the television broadcast signal received via the antenna on the main picture, and corresponding data for recording the externally input signal via on the tape loaded on the deck of the first video recorder/reproducer 60 is supplied to the data input unit 110, the system controller 100 scans the data from the data input unit 10 to output a corresponding control data.

In more detail, by providing the first control signal CS1 via the I/O port P6, the movable shift terminal m of the switch SW1 in the main picture selector 20 is connected to the fixed terminal a. Then, the third control signal CS3 is provided via the I/O port P8 to connect the movable shift terminal m of the switch SW3 of the external input selector 27 to the fixed terminal b.

Accordingly, the main picture selector 20 selects the television broadcast signal from the IF processor 15 among the television broadcast signal from the IF processor 15, externally input signal via the input terminal IN and output signals from the first and second video recorders/reproducers 60 and 70 as of the main picture to supply the selected signal to the sub-picture controller 30. Additionally, the external input selector 27 selects the externally input signal via the input terminal IN to output the selected signal to the amplifying unit 120. At this time, the system controller 100 supplies the fourth control signal CS4 to the first video recorder/reproducer 60 via an I/O port P4. Then, the first video recorder/reproducer 60 executes the recording mode in response to the fourth control signal CS4 to allow for recording of the externally input signal amplified by means of the first amplifier A1 of the amplifying unit 120.

Here, if the user intends to monitor the externally input signal being recorded through the first video recorder/reproducer 60 by processing it as of the sub-picture, the second control signal CS2 is generated from the I/O port P7 to the sub-picture selector 25.

Thus, the movable shift terminal m of the switch SW2 in the sub-picture selector 25 is shifted to the fixed terminal b to select the externally input signal among the television broadcast signal from the IF processor 15, externally input signal via the input terminal IN and output signals from the first and second video recorders/reproducers 60 and 70 as of the sub-picture to supply the selected signal to the sub-picture controller 30. The sub-picture controller 30 mixes the video signals of the main picture and sub-picture from the main picture and sub-picture selectors 20 and 25 to supply the result to the receiver 50 via the color signal processor 40. Consequently, the television broadcast signal is displayed on the main picture and, at the same time, the externally input signal being recorded through the first video recorder/reproducer 60 is displayed on the sub-picture.

That is, the user can monitor the externally input signal being recorded through the first video recorder/reproducer 60 on the sub-picture while watching the television broadcast signal on the main picture.

The processing of the output signal of the first video recorder/reproducer 60 on the sub-picture while watching the television broadcast signal on the main picture is given as an example in the above description, but the recording state can be monitored on the sub-picture while editing the video signal of 8 mm system to the video signal of VHS system, which will be described below.

FIG. 3 is a flow chart for illustrating the automatic editing & recording operation of the video recording/reproducing apparatus according to the present invention.

Once 8 mm tape and VHS tape are respectively loaded to the decks of the first video recorder/reproducer 60 being the 8 mm VCR and second video recorder/reproducer 70 being the VHS VCR in order to edit and record the content recorded on the 8 mm tape onto the VHS tape, the first and second tape loading sensors 65 and 75 realize the loading of the tapes to respective video recorders/reproducers 60 and 70 to supply tape loading sense signals of high state to the AND gate AN of the tape loading confirmation unit 80.

After the AND gate AN receives to perform the NAND operation of the tape loading sense signal, the logically NANDed signal of high state is provided to an I/O port P3 of the system controller 100 as the tape loading confirmation signal. By doing so, the system controller 100 realizes the loading of the tapes to respective video recorders/reproducers 60 and 70.

Under this state, when the user supplies data corresponding to the automatic edit data (the playback mode for the first video recorder/reproducer 60 and the recording mode for the second video recorder/reproducer 70) to the data input unit 110, the system controller 100 provides operational mode control signals to the first and second video recorders/reproducers 60 and 70 via the I/O ports P4 and P5.

Accordingly, the mode of the first video recorder/reproducer 60 is changed to the playback mode (S30), and it is determined whether a record key for performing the automatic editing & recording is supplied to the second video recorder/reproducer 70 (S31).

If another key not of the record key is received in step S31, an operation corresponding to the input key is carried out. When the record key is received, the mode of the second video recorder/reproducer 70 is changed to the recording mode to perform the recording operation (S32).

After this, it is determined whether the user supplies data corresponding to another key, e.g., stop key, or not (S33). Here, if the stop key is received, the operations of the first and second video recorders/reproducers 60 and 70 are stopped (S39). However, if the stop key is not received, the system controller 100 receives the output signal of the signal detector 90 via an I/O port P1 to determine whether the video signal is output from the first video recorder/reproducer 60 or not (S34).

It is determined that the video signal is not provided from the first video recorder/reproducer 60 in step S34, the mode of the second video recorder/reproducer 70 is changed to the still mode (S35) to repeatedly determine whether the video signal is supplied from the first video recorder/reproducer 60 or not (S36).

If the video signal is not output from the first video recorder/reproducer 60 in step S36 as in step S34, a counter included within the system controller 100 is operated (S37).

After operating the counter in step S37, it is determined whether the counting value of the counter exceeds a preset value or not (S38). When the counting value exceeds the preset value, i.e., the video signal is not output from the first video recorder/reproducer 60 for a predetermined time, the program proceeds to step S39 to stop the operation of the first and second video recorders/reproducers 60 and 70, thereby completing the automatic editing & recording. However, if the counting value is smaller than the preset value, the program returns step S36.

In steps S34 and S36, when the video signal is supplied from the first video recorder/reproducer 60 after checking the output of the video signal from the first video recorder/reproducer 60, the program returns to step S32, so that the second video recorder/reproducer 70 continuously records the video signal from the 8 mm tape of the first video recorder/reproducer 60 on the VHS tape thereof.

As described above, in case that the video signal is not supplied from the first video recorder/reproducer 60 for a predetermined time while the video signal from the first video recorder/reproducer 60 is recorded onto the second video recorder/reproducer 70, the automatic editing operation is performed by stopping respective video recorders/reproducers. At this time, if the automatically edited video signal is being monitored, the control signal for selecting the video signal from the first video recorder/reproducer 60 as the sub-picture is produced from the system controller 100 to the sub-picture selector 25. Therefore, the automatically edited video signal is displayed on the sub-picture to conduct the monitoring of the automatic editing state.

FIG. 4 is a flow chart for illustrating the mutual editing & recording operation of the two-picture video recording/reproducing apparatus according to the present invention.

Once a user's key manipulation data is received into the data input unit 110 under the state that the corresponding tapes are loaded to the decks of the first and second video recorders/reproducers 60 and 70 (S40), the system controller 100 determines whether the input data is of the mutual editing & recording mode data or not (S41). Here, if the input data is not of the mutual editing & recording mode data, an operation corresponding to the input data is carried out (S49), thereby completing the operation.

However, if the input data is of the mutual editing & recording mode data, it is determined whether the tapes are loaded or not (S42). In more detail, the first and second tape loading sensors 65 and 75 monitor whether respective tapes are loaded to the decks of the first and second video recorders/reproducers 60 and 70 or not, and supply the tape loading sense signals to the tape loading confirmation unit 80. Successively, the tape loading confirmation unit 80 receives the output signals from the tape loading sensors 65 and 75 to confirm the tape loading, and supplies the tape loading confirmation signal to the system controller 100 via the I/O port P3. By this operation, the system controller 100 determines the tape loading to respective video recorders/reproducers.

After executing the tape loading confirmation operation in step S42, an error message is displayed when the tape is not loaded, and the program is completed.

In step S42, however, when the tapes are loaded, the operational mode of either one of the first and second video recorder/reproducer 60 and 70 is changed to the playback mode in accordance with the user's key data received via the data input unit 110 (S43). Then, the operational mode of the other video recorder/reproducer is changed to the recording mode to perform the mutual editing & recording operation (S44).

After executing step S44, it is determined whether the video signal is supplied from either one of the video recorders/reproducers (S45) to return to step S44 when the video signal is supplied. If not, the counter within the system controller 100 is operated and, simultaneously, the operational mode of the other video recorder/reproducer is changed to the still mode (S46). That is, the signal detector 90 monitors the output of the video signal from either one of the video recorders/reproducers. Also, the system controller 100 receives the sense signal from the signal sensing unit, so that the control signal corresponding to the recording mode is provided to the other video recorder/reproducer which does not supply the video signal when the video signal output is monitored. Whereas, if the video signal is not output, the control signal corresponding to the stop mode is supplied to the other video recorder/reproducer.

After this, the counting value of the counter is determined whether it exceeds a preset value (S47), the modes of all video recorders/reproducers are changed to the stop mode (S48) when the counting value of the counter exceeds the preset value in step S47, thereby completing the mutual editing & recording operation.

When the counting value of the counter is smaller than the preset value, the program returns to step S45 to repeatedly change the operational mode of the other video recorder/reproducer which has been converted to the still mode into the recording mode, thereby performing the editing & recording operation.

The mutual editing operation between two video recorders/reproducers of different system is performed, in which the sub-picture selector 25 selects to output the sub-picture upon receipt of the control signal with respect to the selection of the sub-picture from the system controller 100, so that the mutually edited video signal can also be monitored.

As a result, the two-picture video recording/reproducing apparatus according to the present invention affords the following effects.

First, any one among an externally input signal and output signals from first and second video recorders/reproducers is displayed as of a sub-picture while watching a television broadcast signal as of a main picture. In addition to this, the recorded signal is monitored by displaying the externally input signal on the sub-picture while recording it onto the first and second video recorders/reproducers.

Second, the content on an 8 mm tape is automatically and mutually edited & recorded onto a VHS tape, and vice versa. Besides, the editing & recording state is processed by the sub-picture to monitor the editing & recording state.

Finally, one portion of an important main picture is recorded while watching the externally input signal on the main picture and monitoring the editing & recording state of an optional video recorder/reproducer on the sub-picture.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A two-picture video recording/reproducing apparatus comprising:

a tuner for receiving a television broadcast signal via an antenna to supply a video signal;

intermediate frequency (IF) processing means for processing the video signal from said tuner into an IF signal;

data input means for receiving a signal by a user's key manipulation and supplying predetermined data corresponding to the key manipulation;

a first video recorder/reproducer having a deck capable of loading a tape for recording the input video signal on said tape loaded to said deck in a first system or reproducing to output the video signal recorded on said tape loaded to said deck in said first system in accordance with an operational mode control signal;

a second video recorder/reproducer having a deck capable of loading a tape for recording the input video signal on said tape loaded to said deck in a second system or reproducing to output the video signal recorded on said tape loaded to said deck in said second system in accordance with an operational mode control signal;

main picture selecting means for selecting any one among a signal from said IF processing means, an externally input signal via an input terminal, and video signals from said first and second video recorders/reproducers in accordance with a first control signal, and supplying a selected signal as a video signal of the main picture;

sub-picture selecting means for selecting any one among said signal from said IF processing means, said externally input signal via said input terminal, and said video signals from said first and second video recorders/reproducers in accordance with a second control signal, and supplying a selected signal as a video signal of the sub picture;

external input selecting means for selecting either said signal from said IF processing means or said externally input signal via said input terminal in accordance with a third control signal, and supplying a selected video signal as a record video signal to be recorded to said first and second video recorders/reproducers;

signal detecting means for receiving the output signals from said first and second video recorders/reproducers, automatically detecting a no-signal portion in the input signals, and supplying the detected signal to a system controller;

a still mode conversion means for automatically changing the mode of said second video recorder/reproducer to a still mode when said video signal is not supplied from said first video recorder/reproducer;

a recording mode conversion means for automatically changing the mode of said second video recorder/reproducer to a recording mode when said video signal is supplied from said first video recorder/reproducer within a predetermined time after being converted to said still mode to perform the recording operation;

a system controller for receiving data from said data input means to respectively supply said first to third control signals corresponding to the input data to said main picture selecting means, sub-picture selecting means and external input selecting means, and supplying fourth and fifth control signals to control the operational modes of said first and second video recorders/reproducers;

sub-picture controlling means for receiving to mix the video signals of said main picture and sub-picture selected by said main picture selecting means and sub-picture selecting means; and a receiver for processing the mixed video signal from said sub-picture controlling means as of said main picture and sub-picture to display the processed signal.

2. A two-picture video recording/reproducing apparatus as claimed in claim 1, wherein said main picture selecting means includes a switch for selecting any one among said television broadcast signal from said IF processing means, externally input signal via said input terminal, and video signals from said first and second video recorders/reproducers in accordance with said first control signal from said system controller, and supplying said selected video signal to said sub-picture controlling means as the video signal of said main picture.

3. A two-picture video recording/reproducing apparatus as claimed in claim 1, wherein said sub-picture selecting means includes a switch for selecting any one among said television broadcast signal from said IF processing means, externally input signal via said input terminal, and video signals from said first and second video recorders/reproducers in accordance with said second control signal from said system controller, and supplying said selected video signal to said sub-picture controlling means as the video signal of said sub-picture.

4. A two-picture video recording/reproducing apparatus as claimed in claim 1, wherein said external input selecting means includes a switch for selecting either said television broadcast signal from said IF processing means or said externally input signal via said input terminal in accordance with said third control signal from said system controller, and supplying said selected video signal to said first or second video recorder/reproducer as the record video signal.

5. A two-picture recording/reproducing apparatus as claimed in claim 1, further comprising:

first tape load sensing means for sensing the loading of said tape to said deck of said first video recorder/reproducer;

second tape load sensing means for sensing the loading of said tape to said deck of said second video recorder/reproducer; and tape loading confirmation means for receiving tape loading sense signals from said first and second tape load sensing means to confirm the loading of said tapes.

6. A two-picture video recording/reproducing apparatus as claimed in claim 5, wherein said tape loading confirmation means is formed of an AND gate for using said tape loading sense signal from said first tape load sensing means as one input signal, and said tape loading sense signal from said second tape load sensing means as the other input signal, and performing NAND operation of said two tape loading sense signals to supply the result to said system controller as a tape loading confirmation signal.

7. A two-picture video recording/reproducing apparatus as claimed in claim 1, further comprising amplifying means for amplifying said video signals from said external input means, first and second video recorders/reproducers to supply the result to said first and second video recorders/reproducers.

8. A two-picture video recording/reproducing apparatus as claimed in claim 7, wherein said amplifying means includes:

a first unidirectional amplifier for amplifying the signal from said external input selecting means to output the result to said first video recorder/reproducer;

a second unidirectional amplifier for amplifying the signal from said external input selecting means to output the result to said second video recorder/reproducer;

a third unidirectional amplifier for amplifying the output signal of said first video recorder/reproducer to output the result to said second video recorder/reproducer; and a fourth unidirectional amplifier for amplifying the output signal of said second video recorder/reproducer to output the result to said first video recorder/reproducer.

9. A two-picture video recording/reproducing apparatus as claimed in claim 1, wherein said first video recorder/reproducer is a VCR of 8 mm system, and said second video recorder/reproducer is a VCR of VHS system.

10. A two-picture video recording/reproducing apparatus as claimed in claim 1, further comprising a means for continuously performing said recording operation by said second video recorder/reproducer when said video signal is supplied to said system controller from said first video recorder/reproducer.

11. A two-picture video recording/reproducing apparatus as claimed in claim 1, further comprising a means for changing the modes of said first and second video recorders/reproducers to the still mode when the video signal is not supplied from said video recorder/reproducer for a predetermined time.

12. A two-picture video recording/reproducing apparatus as claimed in claim 1, further comprising:

a means for counting time to automatically change the other video recorder/reproducer to a still mode when the video signal is not supplied, and counting the time with no video signal; and a still mode conversion means for automatically changing the modes of said video recorders/reproducers to a stop mode when the counting value exceeds a preset value.

13. A two-picture video recording/reproducing apparatus as claimed in claim 1, further comprising a means for performing said signal detecting when a counting value is smaller than a preset value, and changing the mode of said second video recorder/reproducer to the recording mode when said video signal is supplied after determining the signal output.

* * * * *